United States Patent
Amano

(10) Patent No.: US 9,313,693 B2
(45) Date of Patent: Apr. 12, 2016

(54) COMMUNICATION APPARATUS, COMMUNICATION APPARATUS CONTROL METHOD, AND PROGRAM

(71) Applicant: CANON KABUSHIKI KAISHA, Tokyo (JP)

(72) Inventor: Ryosuke Amano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/374,775

(22) PCT Filed: Jan. 17, 2013

(86) PCT No.: PCT/JP2013/000197
§ 371 (c)(1),
(2) Date: Jul. 25, 2014

(87) PCT Pub. No.: WO2013/111537
PCT Pub. Date: Aug. 1, 2013

(65) Prior Publication Data
US 2014/0342665 A1    Nov. 20, 2014

(30) Foreign Application Priority Data

Jan. 27, 2012   (JP) .................................. 2012-015599

(51) Int. Cl.
*H04B 5/02*         (2006.01)
*H04W 36/00*        (2009.01)
(Continued)

(52) U.S. Cl.
CPC .......... *H04W 36/0005* (2013.01); *H04W 4/008* (2013.01); *H04W 8/005* (2013.01); *H04W 36/14* (2013.01); *H04W 52/0229* (2013.01); *H04B 5/00* (2013.01); *H04W 36/0038* (2013.01); *H04W 84/12* (2013.01); *H04W 88/06* (2013.01)

(58) Field of Classification Search
CPC ................................ H04W 4/008; H04B 5/02
USPC .................. 455/41.1, 41.2, 550.1, 556.1, 557
See application file for complete search history.

(56) References Cited

U.S. PATENT DOCUMENTS 9,066,228 B2 *   6/2015   Fujii
2010/0254349 A1  10/2010  Aibara et al.
(Continued)

FOREIGN PATENT DOCUMENTS

CN          1692566 A    11/2005
CN        101843124 A     9/2010
(Continued)

OTHER PUBLICATIONS

International Search Report and Written Opinion for PCT/JP2013/000197, dated Mar. 12, 2013.

*Primary Examiner* — Tuan H Nguyen
(74) *Attorney, Agent, or Firm* — Canon USA, Inc. IP Division

(57) ABSTRACT

A communication apparatus includes a first communication unit configured to perform wireless communication in a second communication mode in which information is written into a storage unit from another communication apparatus in a first communication mode, a second communication unit which is different from the first communication unit, and a control unit configured to, in a case where a power source of the communication apparatus is turned on and a communication parameter regarding the second communication unit is stored in the storage unit, control the second communication unit to perform processing for communication connection based on the communication parameter.

16 Claims, 6 Drawing Sheets

(51) Int. Cl.
*H04W 52/02* (2009.01)
*H04W 4/00* (2009.01)
*H04W 8/00* (2009.01)
*H04W 36/14* (2009.01)
*H04B 5/00* (2006.01)
*H04W 84/12* (2009.01)
*H04W 88/06* (2009.01)

(56) References Cited

U.S. PATENT DOCUMENTS

2011/0106954 A1* 5/2011 Chatterjee et al. ............ 709/227
2012/0178421 A1 7/2012 Fujii

FOREIGN PATENT DOCUMENTS

| | | |
|---|---|---|
| CN | 102315864 A | 1/2012 |
| EP | 1499067 A1 | 1/2005 |
| EP | 1659735 A1 | 5/2006 |
| JP | 2004-007351 A | 1/2004 |
| JP | 2009-055505 A | 3/2009 |
| JP | 2009-207069 A | 9/2009 |
| JP | 2010-245748 A | 10/2010 |
| JP | 2011-044090 A | 3/2011 |
| JP | 2011-044092 A | 3/2011 |
| WO | 2007/012909 A1 | 2/2007 |
| WO | 2010/107125 A1 | 9/2010 |
| WO | 2010/115770 A1 | 10/2010 |

* cited by examiner

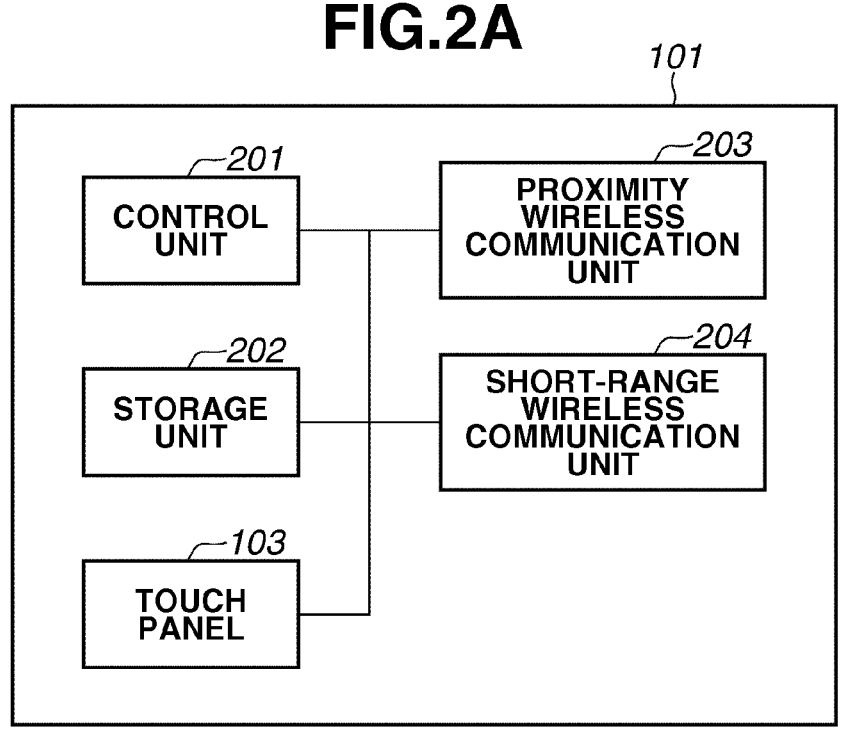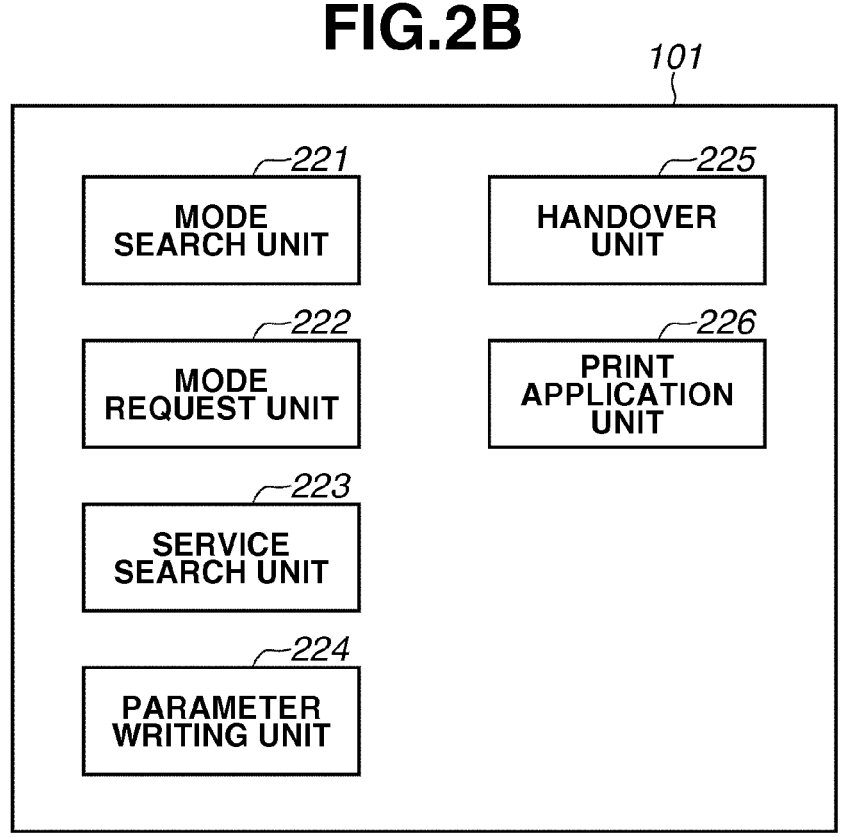

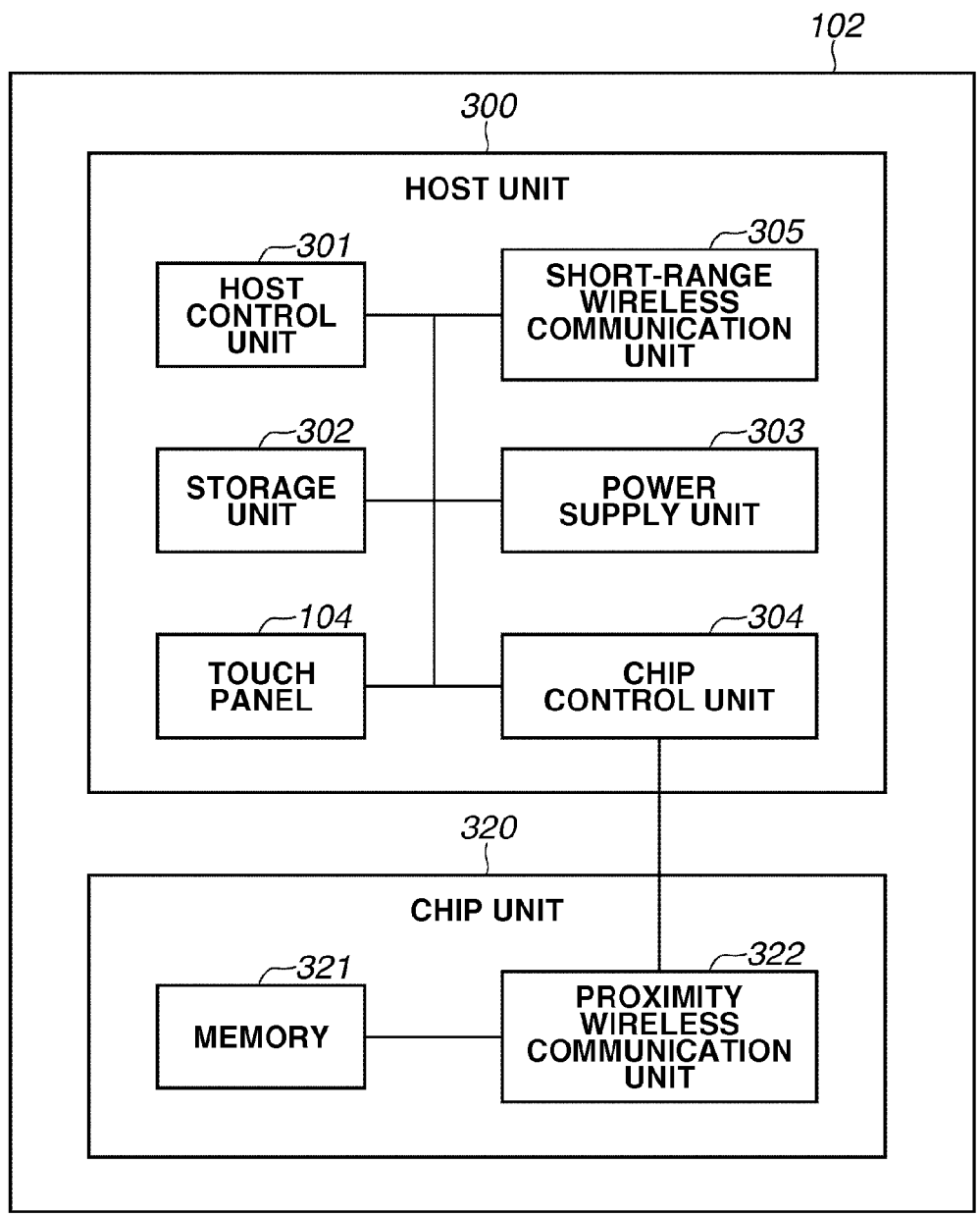

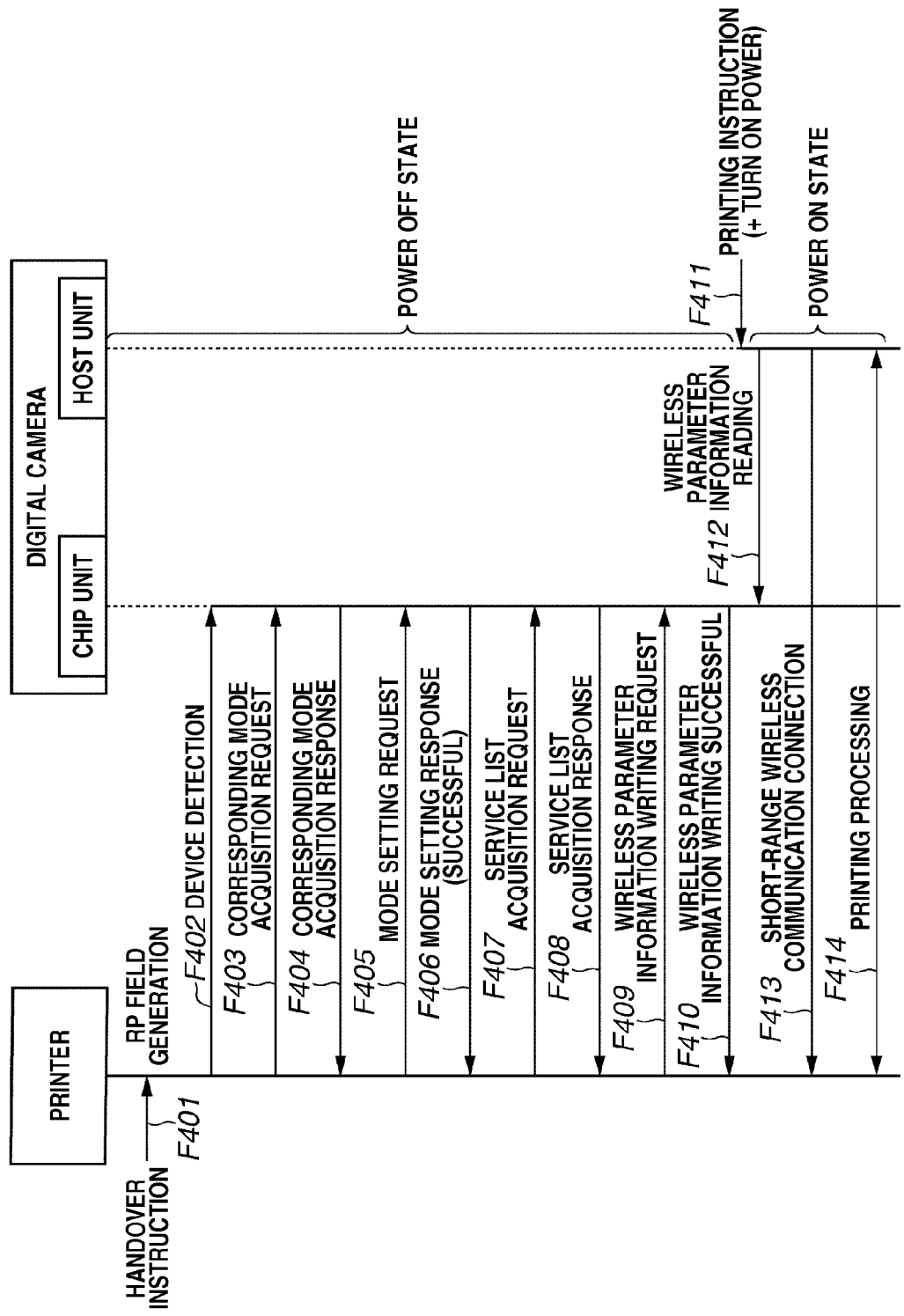

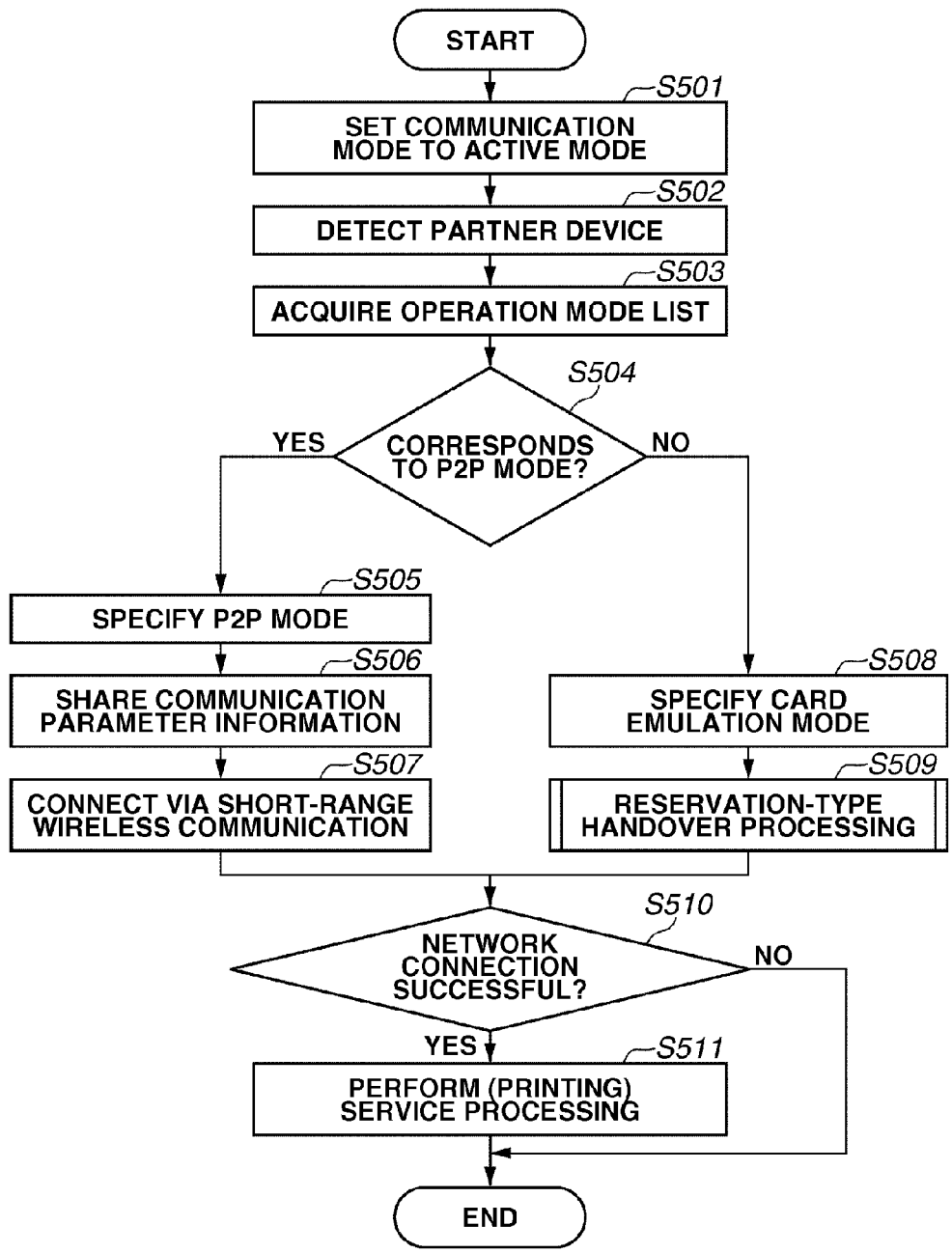

US 9,313,693 B2

COMMUNICATION APPARATUS, COMMUNICATION APPARATUS CONTROL METHOD, AND PROGRAM

TECHNICAL FIELD

The present invention relates to a communication apparatus in which a communication parameter used by a predetermined communication method is shared with another communication method.

BACKGROUND ART

In recent years, Near Field Communication (NFC) has been standardized by the NFC Forum. As a communication mode of the NFC mode, the NFC Forum standardizes three modes which are a card emulation mode for operating as an NFC tag, a reader/writer mode for specifying a memory area (e.g., an address) of the NFC tag to perform reading and writing, and a peer to peer (P2P) mode for mutually communicating data without specifying the memory area.

In addition, as an application using a bidirectional communication mode of the NFC, a protocol is standardized for transmitting a communication parameter necessary for performing handover to another wireless communication method such as a wireless local area network (LAN) (Wi-Fi) from the NFC. By realizing the handover using the NFC, a high-speed communication path such as Wi-Fi can be established only by getting two apparatuses closer to each other. For example, Japanese Patent Application Laid-Open No. 2009-207069 discusses such a technique.

However, the P2P mode of the NFC may not be used by a partner apparatus of the communication in some cases. For example, when an NFC chip unit and a host unit for controlling the NFC chip unit are separated from each other and when the host is in a power-saving state, the NFC chip unit is operated only in a card emulation mode. Generally, communication processing in the P2P mode or the reader/writer mode is complicated compared with that in the card emulation mode, the host unit needs to control the communication processing. In addition, there is a case that the partner apparatus does not comply with the P2P mode in the first place.

As described above, if the partner apparatus cannot use the P2P mode of the NFC, the communication parameter necessary for the handover to the wireless LAN from the NFC cannot be transmitted.

SUMMARY OF INVENTION

According to an aspect of the present invention, a communication apparatus includes a first communication unit configured to perform wireless communication in a second communication mode in which information is written into a storage unit from another communication apparatus in a first communication mode, a second communication unit which is different from the first communication unit, and a control unit configured to, in a case where a power source of the communication apparatus is turned on and a communication parameter regarding the second communication unit is stored in the storage unit, control the second communication unit to perform processing for communication connection based on the communication parameter.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 2A illustrates a configuration of a printer.
FIG. 2B illustrates a configuration of a printer.
FIG. 3 illustrates a configuration of a digital camera.
FIG. 4 is a sequence chart.
FIG. 5 is a flowchart illustrating processing realized by a printer.

DESCRIPTION OF EMBODIMENTS

Various exemplary embodiments, features, and aspects of the invention will be described in detail below with reference to the drawings.

The exemplary embodiment described below is directed to enabling transmission of a communication parameter necessary for performing handover to a partner apparatus that cannot use a mode for transmitting data without specifying a memory area.

Figure 1:
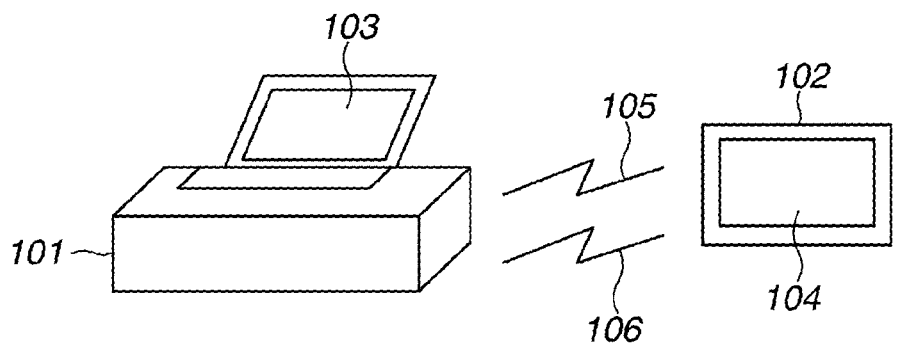
FIG. 1 illustrates a system configuration.

FIG. 1 illustrates a system configuration according to an exemplary embodiment of the present invention. The system configuration of the exemplary embodiment includes a printer 101 and a digital camera 102.

The printer 101 includes a touch panel 103, and the digital camera 102 includes a touch panel 104. The touch panels 103 and 104 display a screen to a user and receive a user's operation.

A proximity wireless communication 105 is a communication path in a first communication method. Data communication can be performed via the proximity wireless communication 105 by getting the printer 101 and the digital camera 102 closer to each other. The proximity wireless communication 105 may include non-contact integrated circuit (IC) card wireless communication utilizing electromagnetic induction, the NFC, communication utilizing an induction electric field, and the like.

With respect to the NFC, the NFC Forum has worked on the standardization thereof, and two communication modes and three operation modes described below are specified. The communication mode specifies a role for physically connecting apparatuses and includes two communication modes of an active mode and a passive mode.

The active mode generates a radio frequency (RF) field (radio frequency electromagnetic field) with power of its own apparatus to start communication, and the passive mode uses the RF field of a partner apparatus to start communication. Therefore, when an apparatus operates in the passive mode, the communication is operated with the power supplied from an apparatus operating in the active mode.

The operation mode specifies a role for establishing a logical communication path between the physically connected partner apparatus and the own apparatus, and includes a reader/writer mode, a card emulation mode, and a P2P mode.

In the reader/writer mode, an apparatus in the reader/writer mode specifies a memory area retained by a NFC tag to perform reading and writing. In the card emulation mode, a memory access from the apparatus in the reader/writer mode is received by emulating the NFC tag. In the P2P mode, a data packet is bi-directionally transmitted to and received from the partner apparatus, and the both apparatuses need to be operated in the P2P mode. When the both apparatuses are in the P2P mode, unlike the reader/writer mode, when a data packet is transmitted or received, the memory area is not specified. When the both apparatuses operated in the P2P mode, the apparatuses can issue a data transmission/reception request to one another, and namely stand on an equal footing.

In addition, the NFC Forum standardizes NFC connection handover for performing the handover (switching the communication method) to the communication method other than the NFC such as Bluetooth and Wi-Fi. The NFC connection handover specifies a dynamic handover method for utilizing the P2P mode. In the dynamic hand over method, the both apparatuses generate information necessary for the handover and exchange the information therebetween at arbitrary timing.

A short-range wireless communication 106 is a communication path in a second communication method. Wireless communication can be directly performed between the printer 101 and the digital camera 102, or can be performed via a relay apparatus such as an access point (AP). The short-range wireless communication 106 may include the wireless LAN complying with the Institute of Electrical and Electronics Engineers (IEEE)802.11 series and the communication utilizing Bluetooth.

The short-range wireless communication 106 has a feature that includes a larger communication area, compared with the proximity wireless communication 105. In addition, in the short-range wireless communication 106, communication parameters including information about an encryption method, an encryption key, an authentication method, an authentication key, and the like are set to perform encryption and authentication, so that communication can be safely performed. More specifically, the short-range wireless communication 106 includes Wi-Fi Protected Access (WPA) standardized by the Wi-Fi alliance.

Further, in the Wi-Fi alliance, a method is standardized for simplifying setting of communication parameters, and the standards of Wi-Fi Protected Setup (WPS) and Wi-Fi Direct are also included.

In the above-described standards, in addition to the setting of the communication parameter by pressing a button of the apparatus, an out-of-band (OOB) interface method is specified for exchanging and setting communication parameter information between the apparatuses using a communication path other than the wireless LAN such as the NFC.

In the OOB method, a method is specified for exchanging a network identifier and a communication parameter of the short-range wireless communication 106 utilizing the NFC connection handover standardized by the NFC.

FIG. 2A is a block diagram illustrating a hardware configuration of the printer 101. A control unit 201 includes a central processing unit (CPU) and a microprocessor unit (MPU), and executes a program stored in a storage unit 202 to control the entire printer 101.

The storage unit 202 includes a read only memory (ROM) and a random access memory (RAM), and stores programs to be executed by the control unit 201 and various types of information such as a communication parameter. Various operations described below are performed when the control unit 201 executes the program stored in the storage unit 202. For the storage unit 202, in addition to the memory such as the ROM and the RAM, a storage medium such as a flexible disk, a hard disk, an optical disk, a magneto-optical disk, a compact disk (CD)-ROM, a CD-recordable (R), a magnetic tape, a non-volatile memory card, and a digital versatile disk (DVD) may be used.

A proximity wireless communication unit 203 performs proximity wireless communication 105. When the proximity wireless communication unit 203 detects a communicable partner apparatus within a communication area, the proximity wireless communication unit 203 automatically establishes the proximity wireless communication 105.

When the proximity wireless communication 105 is established, the communication can be performed with the partner apparatus using any of the reader/writer mode, the card emulation mode, and the P2P mode.

A short-range wireless communication unit 204 performs the short-range wireless communication 106. The short-range wireless communication unit 204 specifies a communicable apparatus within the communication area, or is specified by the apparatus that can communicate therewith to establish short range wireless connection with the apparatus.

FIG. 2B is a block diagram of a software function to be realized when the control unit 201 of the printer 101 reads a program stored in the storage unit 202.

A mode search unit 221 searches for an operation mode that can be currently operated by a proximity wireless communication unit (322 herein) of the partner apparatus. A mode request unit 222 requests a mode in which the proximity wireless communication unit of the partner apparatus operates from the partner apparatus.

A service search unit 223 searches for a service that the partner apparatus complies with when the printer 101 communicates with the partner apparatus in the reader/writer mode of the proximity wireless communication 105. The service search unit 223 acquires a list in which each service that can be provided by the partner apparatus operated by a tag or in the card emulation mode is associated with a memory address for accessing each service.

The service includes a point card service and an electronic money service such as Edy and a mobile wallet.

In addition, a memory area in which the communication parameter information is written in reservation-type handover processing provided by a handover unit 225 described below is defined as a service, and can be searched by the service search unit 223.

A parameter writing unit 224 writes the communication parameter used for the communication with the partner apparatus via the short-range wireless communication 106 by the short-range wireless communication unit 204 into a predetermined memory included in the partner apparatus.

A handover unit 225 performs the handover processing for communicating via the short-range wireless communication 106 with the partner apparatus in communication via the proximity wireless communication 105. The handover processing performed by the handover unit 225 includes two methods of immediate handover processing and the reservation-type handover processing.

In the immediate handover processing, the apparatuses exchange the network identifier (service set identifier (SSID)) and the communication parameter (such as the encryption key and the authentication method) by a similar method to the dynamic handover method specified by the NFC Forum. Subsequently, the apparatus is immediately connected to the network of the short-range wireless communication 106.

Further, the apparatuses exchange device identifications (IDs) that are information for identifying each other, so that the apparatus can specify the partner apparatus in the network based on the device ID after the apparatus is connected to the network. For example, the partner apparatus can be specified using a device discovery protocol such as a simple service discovery protocol (SSDP) and a multicast domain name system (mDNS).

On the other hand, in the reservation-type handover processing, the apparatus writes the communication parameter information into a predetermined memory area for the proximity wireless communication of the partner apparatus utilizing the reader/writer mode to make a reservation of connection of the short-range wireless communication 106. The information to be written by the reservation-type handover processing includes the network identifier, the communication parameter information, the device ID, and an expiration date of the communication parameter.

By writing the expiration date of the communication parameter, it is clearly indicated that the connection of the short-range wireless communication 106 from the partner apparatus is waited only until the expiration date elapses, and thus the partner apparatus can be connected to the network at an arbitrary timing before the expiration date.

A selection algorithm of the above-described handover processing method by the handover unit 225 will be described below.

The communication is performed between the printer 101 and the digital camera 102 using the short-range wireless communication 106, and then a print application unit 226 performs printing processing. The print application unit 226 performs processing for printing image data received from the digital camera 102.

FIG. 3 is a block diagram illustrating a hardware configuration of the digital camera 102. The hardware of the digital camera 102 is roughly separated into a host unit 300 and a chip unit 320. The host unit 300 and the chip unit 320 can be independently operated.

The host unit 300 includes units described below. A host control unit 301 includes a CPU and an MPU, and executes a program stored in a storage unit 302 to control the entire digital camera 102.

The storage unit 302 includes a ROM and a RAM, and stores programs to be executed by the host control unit 301 and various types of information such as a communication parameter. Various operations described below are performed when the host control unit 301 executes the program stored in the storage unit 302. For the storage unit 302, in addition to the memory such as the ROM and the RAM, a storage medium such as a flexible disk, a hard disk, an optical disk, a magneto-optical disk, a CD-ROM, a CD-R, a magnetic tape, a non-volatile memory card, and a DVD may be used.

A power supply unit 303 includes a battery and supplies power to the host unit 300 and the chip unit 320. When the power supply unit 303 is connected with a commercial power supply, the power supply unit 303 is further operated as an adopter for supplying the power from the commercial power supply to the host unit 300 and the chip unit 320.

A chip control unit 304 controls the chip unit 320 to control the proximity wireless communication 105. The chip unit 320 is controlled by the chip control unit 304, and thus can provide the reader/writer mode or the P2P mode. When the host unit 300 is in a sleep state, in other words, when the host unit 300 is not controlled by the chip control unit 304, the chip unit 320 can utilize only the card emulation mode.

The host unit 300 further includes the touch panel 104 and a short-range wireless communication unit 305 for performing the short-range wireless communication 106. The short-range wireless communication unit 305 refers to the memory area for the reservation-type handover processing retained in a memory 321 to acquire the communication parameter when the power to the host unit 300 is turned on, and then establishes the short-range wireless communication 106 using the communication parameter.

The chip unit 320 will be described. The chip unit 320 is operated by receiving the power supply from the host unit 300 or the power from the partner apparatus by being connected as a passive mode to the partner apparatus in the active mode. The power is supplied from the partner apparatus only to the chip unit 320 but not to the host unit 300.

The chip unit 320 includes the memory 321 and a proximity wireless communication unit 322. When the card emulation mode is used, the memory 321 provides the memory area which the partner apparatus in the reader/writer mode can access. Further, the memory 321 provides the memory area for the reservation-type handover processing.

The proximity wireless communication unit 322 is operated in the reader/writer mode or the P2P mode by being controlled by the chip control unit 304 and performs the proximity wireless communication 105. When the host unit 300 is in the sleep state and the proximity wireless communication unit 322 is not controlled by the chip control unit 304, the proximity wireless communication unit 322 is operated in the card emulation mode to perform the proximity wireless communication 105.

With reference to a sequence chart illustrated in FIG. 4, a sequence of processing according to the present exemplary embodiment will be described below. In an initial state, it is assumed that the printer 101 and the digital camera 102 are positioned enough far away from each other not to communicate with each other via the proximity wireless communication 105.

In addition, the proximity wireless communication unit 203 of the printer 101 is in a state that can be wirelessly connected in the passive mode. The host unit 300 of the digital camera 102 is in the sleep state (hereinafter, referred to as a power-off state), the chip unit 320 is in an active state (hereinafter, referred to as a power-on state), and the proximity wireless communication unit 322 is in a state that can be wirelessly connected in the passive mode.

In step F401, when a user operates the touch panel 103 of the printer 101 to issue an instruction to execute the handover processing, the proximity wireless communication unit 203 switches the communication mode to the active mode to generate the RF field. In this state, when the user gets the printer 101 and the digital camera 102 closer to each other within the predetermined communication area, then in step F402, the proximity wireless communication unit 203 detects the digital camera 102, and then starts the proximity wireless communication 105.

When the proximity wireless communication 105 is started, in step F403, the mode search unit 221 requests via the proximity wireless communication 105 a list of operation modes with which the digital camera 102 complies.

In step F404, since the host unit 300 is in the power-off state, the digital camera 102 responds to the printer 101 with the list of the operation modes including only the card emulation mode. Upon reception of the list, in step F405, the mode request unit 222 requests the digital camera 102 to set the operation mode to the card emulation mode.

In step F406, the printer 101 receives a response indicating successful setting of the card emulation mode from the digital camera 102 that has received the request, and then in step F407, the service search unit 223 requests a list of services that the digital camera 102 can provide.

In step F408, upon receiving the list of the services from the digital camera 102 as a response, the service search unit 223 confirms that the list includes the service for the reservation-type handover processing. If it is confirmed that the list includes the service for the reservation-type handover processing, the short-range wireless communication unit 204 generates a network of the short-range wireless communication 106. In step F409, the parameter writing unit 224 requests the memory 321 of the digital camera 102 to write the communication parameter information of the network.

In step F410, upon receiving a response from the digital camera 102 indicating that the communication parameter information has been successfully written, the short-range wireless communication unit 204 waits the digital camera 102 to be connected via the short-range wireless communication 106.

On the other hand, in step F411, when the digital camera 102 receives an instruction input by the user via the touch panel 104 to turn on the power supply of the host unit 300 and to start printing processing, then in step F412, the chip control unit 304 reads the communication parameter information from the memory 321 of the chip unit 320. In step F413, based on the read communication parameter information, the short-range wireless communication unit 305 starts connection of the short-range wireless communication 106.

When the connection of the short-range wireless communication 106 is completed, then in step F414, the printing processing is performed between the printer 101 and the digital camera 102.

With reference to operation flowcharts illustrated in FIGS. 5 and 6, the operation of the printer 101 according to the present exemplary embodiment will be described below. In the initial state of the printer 101, the communication via the proximity wireless communication 105 is not started.

When a user operates the touch panel 103 to input an instruction to start the handover processing, in step S501, the handover unit 225 sets the communication mode of the proximity wireless communication unit 203 to the active mode. In step S502, the proximity wireless communication unit 203 set to the active mode detects that the digital camera 102 is located within the communication area of the proximity wireless communication 105.

When the digital camera 102 is detected, in step S503, the mode search unit 221 acquires the list of the operation modes in which the proximity wireless communication unit 322 of the digital camera 102 can be currently operated. Since the host unit 300 of the digital camera 102 is in the power-off state, the list includes only the card emulation mode. However, when the host unit 300 of the digital camera 102 is in the power-on mode, the list includes the P2P mode and the reader/writer mode in addition to the card emulation mode.

In step S504, the mode search unit 221 further determines whether the digital camera 102 can be operated in the P2P mode with reference to the acquired list of the operation modes. If the digital camera 102 can be operated in the P2P mode (YES in step S504), then in step S505, the mode request unit 222 specifies the operation mode of the digital camera 102 to the P2P mode and performs the immediate handover processing.

In step S506, in the immediate handover processing, the handover unit 225 shares the communication parameter information according to a dynamic handover method of the NFC handover as described above. In step S507, using the communication parameter, the short-range wireless communication unit 204 attempts to connect with the digital camera 102 via the short-range wireless communication 106.

On the other hand, if the digital camera 102 cannot be operated in the P2P mode (NO in step S504), then in step S508, the mode request unit 222 specifies the operation mode of the digital camera 102 to the card emulation mode.

In step S509, the handover unit 225 performs the reservation-type handover processing.

Details of the reservation-type handover processing will be described below with reference to FIG. 6. In step S601, the service search unit 223 acquires from the digital camera 102 a list of the services that can be provided by the digital camera 102 and the memory addresses. Then in step S602, the service search unit 223 searches the list for the reservation-type handover processing service.

Figure 6:
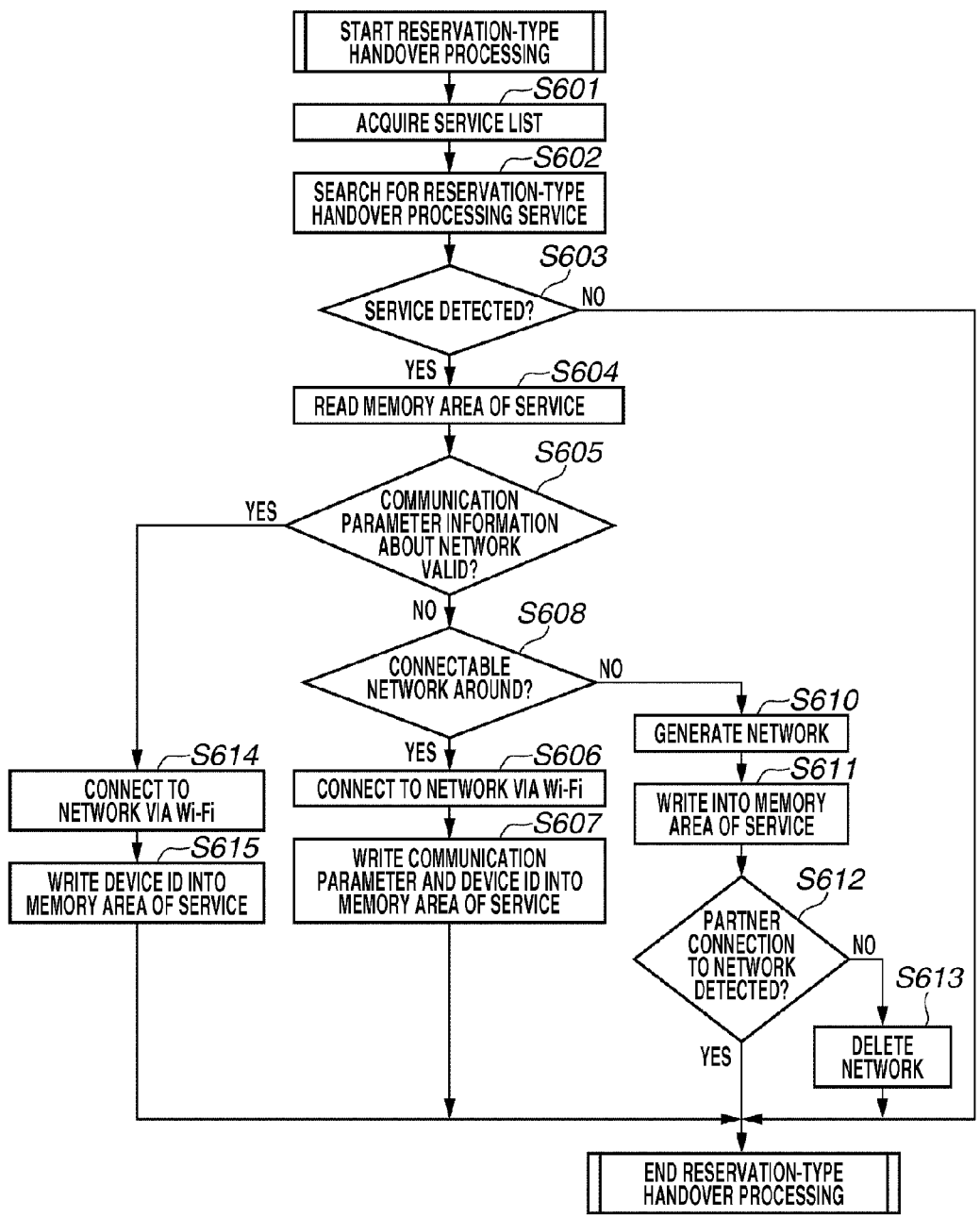
FIG. 6 is a flowchart illustrating processing realized by a printer.

In step S603, as a result of the search, if the reservation-type handover processing service cannot be detected (NO in step S603), the reservation-type handover processing illustrated in FIG. 6 is ended.

On the other hand, as the result of the search, if the reservation-type handover processing service is detected (YES in step S603), then in step S604, the handover unit 225 accesses the memory address corresponding to the reservation-type handover processing service to read information about the network identifier, the communication parameter, and the expiration date of the short-range wireless communication 106.

In step S605, based on the expiration date, the handover unit 225 determines whether the communication parameter information is valid. In other words, when the expiration date has not passed, the communication parameter information is determined to be valid. When the expiration date has passed, the communication parameter information is determined to be invalid.

The above-described determination processing may be performed by the following manner. That is, the network of the short-range wireless communication 106 may be scanned, and validity of the communication parameter information may be determined based on whether the network corresponding to the network identifier exists within a communicable area.

Further, information indicating whether the network of the short-range wireless communication 106 corresponding to the network identifier is in an infrastructure mode or in an ad hoc mode is read in step S604, and based on the information, the validity of the communication parameter information may be determined.

Furthermore, information indicating whether the apparatus generating the network of the short-range wireless communication 106 corresponding to the network identifier is the digital camera 102 is read in step S604, and based on the information, the validity of the communication parameter information may be determined.

In other words, since it is confirmed that the network is the one generated by the partner apparatus to be connected, it can be avoided being connected to any other network in which the partner apparatus does not participate, so that a processing load can be reduced. Further, since the apparatus is not connected to the any other network not to be intended to be connected, security can be improved.

If it is determined that the communication parameter read from the digital camera 102 is valid (YES in step S605), then in step S614, the short-range wireless communication unit 204 connects to the network of the short-range wireless communication 106 corresponding to the identifier included in the communication parameter information.

When connection to the network is completed, in step S615, the handover unit 225 writes the device ID into the memory area for the reservation-type handover processing service of the digital camera 102, and the reserve-type handover processing is ended.

On the other hand, when it is determined that the communication parameter read from the digital camera 102 is invalid (NO in step S605), in step S608, it is determined whether a connectable network of the short-range wireless communication 106 exists in neighboring.

In this step, information about the network of the short-range wireless communication 106 existing in the neighboring is scanned, and then compared with history information stored in the storage unit 202 to determine whether the network including the same identifier exists. The information about the network of the short-range wireless communication 106 when the network has communicated with the digital camera 102 in the past may be stored in the storage unit 202, and the information may be compared with a scanning result to determine whether the network including the same identifier exists.

When it is determined that the connectable network exists in the neighboring (YES in S608), in step S606, the short-range wireless communication unit 204 is connected to a connectable network. Then, in step S607, the parameter writing unit 224 writes the identifier of the network, the communication parameter, the device ID, and the expiration date in the memory area for the reservation-type handover processing service of the digital camera 102, and then the reservation-type handover processing is ended.

On the other hand, when it is determined that the connectable network capable does not exist in the neighboring (NO in step S608), in step S610, the short-range wireless communication unit 204 generates a network. When generation of the network is completed, then in step S611, the parameter writing unit 224 writes the identifier of the network, the communication parameter, the device ID, and the expiration date into the memory area for the reservation-type handover processing service of the digital camera 102.

In step S612, further, until the expiration date passes, the printer 101 waits for the connection of the digital camera 102 to the network.

When the connection of the digital camera 102 is detected before the expiration date passes (YES in step S612), the reservation-type handover processing is ended as it is.

On the other hand, if the expiration date passes with no connection from the digital camera 102 detected (NO in step S612), then in step S613, the short-range wireless communication unit 204 deletes the network generated by the processing performed in step S610, and the reservation-type handover processing is ended.

As described above, when the immediate handover processing or the reservation-type handover processing is ended, then in step S510, it is determined whether the printer 101 is successfully connected to the network of the short-range wireless communication 106 corresponding to the network identifier exchanged by the handover processing.

If it is determined that the printer 101 has been successfully connected (YES in step S510), then in step S511, the printing processing is performed by the print application unit 226.

When the printer 101 is communicated with the digital camera 102 and the printing processing is completed, the processing according to the present exemplary embodiment is ended.

After the printing processing has been completed, processing for disconnecting from the network connected by the immediate handover processing or the reservation-type handover processing may be performed, and then the processing according to the present exemplary embodiment may be ended.

On the other hand, if it is determined that the connection has been failed (NO in step S510), the processing according to the present exemplary embodiment is immediately ended.

As described above, according to the present exemplary embodiment, the handover processing using the proximity wireless communication 105 can be executed in a state that the host unit of the digital camera 102 is in the power-supply off state, so that power consumption of the digital camera 102 to be used for the handover processing can be reduced.

Further, a user does not need to turn on the power supply of the host unit 300 of the digital camera 102 to supply the power to the chip unit 320 in advance to perform the handover processing, and thus operability can be improved.

Further, information including the expiration date of the network is written into the memory of the digital camera 102, and thus the digital camera 102 can determine that connection processing is not necessary to be performed, when the digital camera 102 is activated after the expiration date has passed.

Therefore, the digital camera 102 can reduce the power consumption to be used for the connection processing to the network.

Aspects of the present invention can also be realized by a computer of a system or apparatus (or devices such as a CPU or an MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application is a national phase application of international application PCT/JP2013/000197, filed on Jan. 17, 2013, which is hereby incorporated by reference herein in its entirety, and this application claims the benefit of Japanese Patent Application No. 2012-015599, filed Jan. 27, 2012, which is hereby incorporated by reference herein in its entirety.

The invention claimed is:

1. A communication apparatus comprising:
a first communication unit configured to perform proximity wireless communication in a tag mode in which information is written from another communication apparatus in a reader/writer mode;
a second communication unit which is different from the first communication unit;
a storage unit configured to store, in a communication started by the first communication unit with the another communication apparatus in a state where a power source of the communication apparatus is turned off, a communication parameter received by the first communication unit operating in the tag mode from the another communication apparatus in a memory area wherein the communication parameter includes at least one of a service set identification (SSID), a key and an authentication type for performing communication using the second communication unit; and
a control unit configured to, in a state where the power source of the communication apparatus is turned on, control the second communication unit to perform processing for communication connection based on the communication parameter stored by the storage unit in the memory area.

2. The communication apparatus according to claim 1, wherein the first communication unit performs communication using an electric power generated based on an electromagnetic field which is generated by the another communication apparatus.

3. The communication apparatus according to claim 1, wherein the first communication unit performs communication by near field communication (NFC).

4. The communication apparatus according to claim 1, wherein the reader/writer mode is a reader/writer mode specified by NFC, and the tag mode is a card emulation mode specified by NFC.

5. The communication apparatus according to claim 1, wherein the second communication unit performs wireless communication complying with the Institute of Electrical and Electronics Engineers (IEEE) 802.11 series.

6. The communication apparatus according to claim 1, wherein the communication apparatus is a digital camera.

7. The communication apparatus according to claim 1, wherein, in a state where the power source of the communication apparatus is turned on and a communication parameter regarding the second communication unit is stored in the storage unit, the control unit controls the second communication unit to perform processing for the communication connection according to device information which is stored in the storage unit in association with the communication parameter.

8. The communication apparatus according to claim 1, wherein in a case where the first communication unit connects with the another communication apparatus, the first communication unit notifies the another communication apparatus of a communication mode which can be executed.

9. The communication apparatus according to claim 1, wherein in a case where the first communication unit connects with the another communication apparatus, the first communication unit notifies the another communication apparatus of information about a communication service.

10. The communication apparatus according to claim 1, wherein the control unit controls the second communication unit to perform processing for connecting with the another communication apparatus.

11. The communication apparatus according to claim 1, wherein the control unit controls, in a state where the power source of the communication apparatus is turned on, the second communication unit to automatically perform the processing for communication connection based on the communication parameter without the communication apparatus accepting from a user an instruction for starting communication connection to be performed by the second communication unit after the power source of the communication apparatus is turned on.

12. The communication apparatus according to claim 1, wherein the second communication unit performs communication for a communication service, with the another communication apparatus via the communication connection established by the processing performed according to the control performed by the controlling unit.

13. The communication apparatus according to claim 12, wherein the communication service is a printing service that the communication apparatus causes, by transmitting data to the another communication apparatus, the another communication apparatus to print the transmitted data.

14. The communication apparatus according to claim 1, wherein the second communication unit performs a wireless communication having a communication range wider than a communication range of the first communication unit.

15. A method for controlling a communication apparatus comprising a first communication unit configured to perform proximity wireless communication in a tag mode in which information is written from another communication apparatus in a reader/writer mode, a second communication unit which is different from the first communication unit and a storage unit configured to store, in a communication started by the first communication unit with the another communication apparatus in a state where a power source of the communication apparatus is turned off, a communication parameter received by the first communication unit operating in the tag mode from the another communication apparatus in a memory area wherein the communication parameter includes at least one of a service set identification (SSID), a key and an authentication type for performing communication using the second communication unit, the method comprising:

controlling, in a state where the power source of the communication apparatus is turned on, the second communication unit to perform processing for communication connection based on the communication parameter stored by the storage unit in the memory area.

16. A non-transitory storage medium storing a program for causing a computer to execute a method for controlling a communication apparatus comprising a first communication unit configured to perform proximity wireless communication in a tag mode in which information is written from another communication apparatus in a reader/writer mode, a second communication unit which is different from the first communication unit and a storage unit configured to store, in a communication started by the first communication unit with the another communication apparatus in a state where a power source of the communication apparatus is turned off, a communication parameter received by the first communication unit operating in the tag mode from the another communication apparatus in a memory area wherein the communication parameter includes at least one of a service set identification (SSID), a key and an authentication type for performing communication using the second communication unit, the method comprising:

controlling, in a state where the power source of the communication apparatus is turned on, the second communication unit to perform processing for communication connection based on the communication parameter stored by the storage unit in the memory area.

* * * * *